United States Patent
Peine et al.

(10) Patent No.: US 11,440,360 B2
(45) Date of Patent: Sep. 13, 2022

(54) TIRE PRESSURE SENSOR MODULES, TIRE PRESSURE MONITORING SYSTEM, WHEEL, METHODS AND COMPUTER PROGRAMS FOR PROVIDING INFORMATION RELATED TO A TIRE PRESSURE

(71) Applicant: Infineon Technologies AG, Neubiberg (DE)

(72) Inventors: Andre Peine, Munich (DE); Thomas Lange, Munich (DE)

(73) Assignee: Infineon Technologies AG, Neubiberg (DE)

( * ) Notice: Subject to any disclaimer, the term of this patent is extended or adjusted under 35 U.S.C. 154(b) by 159 days.

(21) Appl. No.: 16/934,208

(22) Filed: Jul. 21, 2020

(65) Prior Publication Data
US 2020/0346501 A1    Nov. 5, 2020

Related U.S. Application Data

(60) Division of application No. 15/933,759, filed on Mar. 23, 2018, now Pat. No. 10,759,235, which is a (Continued)

(30) Foreign Application Priority Data

Jul. 18, 2014   (DE) .......................... 102014110184.7

(51) Int. Cl.
*B60C 23/04* (2006.01)
(52) U.S. Cl.
CPC ...... *B60C 23/0486* (2013.01); *B60C 23/0411* (2013.01); *B60C 23/0454* (2013.01);
(Continued)

(58) Field of Classification Search
CPC ............ B60C 23/0408; B60C 23/0496; B60C 23/061; B60C 23/0494; B60C 23/0416;
(Continued)

(56) References Cited

U.S. PATENT DOCUMENTS 5,741,966 A    4/1998   Handfield
5,774,048 A    6/1998   Achterholt
(Continued)

FOREIGN PATENT DOCUMENTS

CN    201456949 U    5/2010
CN    102229313 A    11/2011
(Continued)

OTHER PUBLICATIONS

Notice of Allowance dated Jan. 6, 2017 for U.S. Appl. No. 14/802,152.
(Continued)

*Primary Examiner* — Andre J Allen
(74) *Attorney, Agent, or Firm* — Eschweiler & Potashnik, LLC

(57) ABSTRACT

A first tire pressure sensor module is configured to provide information related to a pressure of a tire of a vehicle and comprises a pressure sensor configured to determine the information related to the pressure of the tire. The pressure module further includes a controller configured to selectively operate the tire pressure sensor module in an active state and in an inactive state, wherein an energy consumption of the tire pressure sensor module is lower in the inactive state than in the active state. The controller is further configured to control an output of the information related to the pressure of the tire in the active state, and operate the tire pressure sensor module in the inactive state based on determining that information related to a velocity of the tire indicates a velocity above a threshold.

15 Claims, 5 Drawing Sheets

Related U.S. Application Data continuation of application No. 15/469,862, filed on Mar. 27, 2017, now Pat. No. 9,925,837, which is a division of application No. 14/802,152, filed on Jul. 17, 2015, now Pat. No. 9,643,460.

(52) U.S. Cl.
CPC ...... *B60C 23/0459* (2013.01); *B60C 23/0488* (2013.01); *B60C 23/0494* (2013.01); *B60C 23/041* (2013.01); *B60C 23/0474* (2013.01)

(58) Field of Classification Search
CPC . B60C 23/0433; B60C 23/0493; B60C 19/00; B60C 23/04; B60C 23/041; B60C 23/0411; B60C 23/0462; B60C 23/20; B60C 23/0444; B60C 11/24; B60C 23/0479; B60C 23/064; B60C 23/007; B60C 23/062; B60C 23/0401; B60C 23/0413; B60C 23/0488; B60C 23/043; B60C 23/06; B60C 23/0452; B60C 23/0467; B60C 11/246; B60C 23/0498; B60C 23/02; B60C 99/006; B60C 23/0428; B60C 23/0442; B60C 23/009; B60C 23/0425; B60C 2019/004; B60C 23/004; B60C 11/243; B60C 23/00354; B60C 23/045; B60C 23/0464; B60C 23/003; B60C 23/00318; B60C 23/0472; B60C 23/066; B60C 23/00372; B60C 23/0403; B60C 23/04985; B60C 23/0406; B60C 29/02; B60C 11/00; B60C 23/006; B60C 23/044; B60C 23/00; B60C 23/008; B60C 23/0455; B60C 23/0454; B60C 23/0461; B60C 23/0483; B60C 23/0474; B60C 23/0415; B60C 23/0491; B60C 23/0489; B60C 25/002; B60C 29/064; B60C 23/00363; B60C 23/0471; B60C 11/0318; B60C 23/0459; B60C 23/0481; B60C 2019/005; B60C 23/002; B60C 23/042; B60C 23/0422; B60C 23/0423; B60C 23/0466; B60C 2200/02; B60C 23/0405; B60C 23/0477; B60C 29/06; B60C 13/001; B60C 23/0437; B60C 23/0476; B60C 25/132; B60C 23/0447; B60C 23/0427; B60C 23/0449; B60C 25/00; B60C 9/18; B60C 13/00; B60C 19/003; B60C 23/0484; B60C 23/065; B60C 23/00336; B60C 23/0486; B60C 23/08; B60C 17/00; B60C 2019/006; B60C 23/001; B60C 25/142; B60C 17/02; B60C 23/00345; B60C 23/0445; B60C 5/004; B60C 11/0083; B60C 25/145; B60C 29/00; B60C 9/02; B60C 11/0332; B60C 23/0457; B60C 23/12; B60C 25/18; B60C 11/13; B60C 23/0418; B60C 23/0469; B60C 29/066; B60C 23/068; B60C 25/005; B60C 25/138; B60C 11/03; B60C 23/005; B60C 23/0432; B60C 3/00; B60C 5/14; B60C 99/00; B60C 11/11; B60C 17/04; B60C 17/06; B60C 23/063; B60C 23/10; B60C 25/007; B60C 25/0554; B60C 25/14; B60C 29/062; B60C 99/003; B60C 11/032; B60C 11/12; B60C 13/003; B60C 19/001; B60C 23/0435; B60C 23/127; B60C 23/16; B60C 29/068; B60C 3/04; B60C 9/20; B60C 11/01; B60C 11/0302; B60C 13/02; B60C 23/126; B60C 25/056; B60C 29/005; B60C 29/04; B60C 5/142; B60C 11/0304; B60C 11/0306; B60C 15/06; B60C 2009/2038; B60C 2011/0374; B60C 2011/0388; B60C 2011/1213; B60C 2011/1231; B60C 2011/1245; B60C 2200/065; B60C 23/00305; B60C 23/067; B60C 23/135; B60C 23/137; B60C 23/18; B60C 25/02; B60C 7/12; B60C 11/02; B60C 17/0009; B60C 19/002; B60C 19/08; B60C 19/12; B60C 2019/007; B60C 23/00347; B60C 23/131; B60C 25/05; B60C 5/001; B60C 5/22; B60C 1/0008; B60C 1/0016; B60C 11/0058; B60C 11/0311; B60C 11/033; B60C 11/1218; B60C 11/124; B60C 11/1384; B60C 13/04; B60C 15/0036; B60C 15/024; B60C 17/041; B60C 17/066; B60C 2007/005; B60C 2009/0071; B60C 2009/2022; B60C 2009/2025; B60C 2011/0358; B60C 2011/1254; B60C 2017/068; B60C 2200/06; B60C 2200/12; B60C 2200/14; B60C 23/121; B60C 23/123; B60C 23/133; B60C 25/0503; B60C 25/0515; B60C 25/0521; B60C 25/0551; B60C 25/15; B60C 25/16; B60C 29/007; B60C 3/06; B60C 5/002; B60C 5/02; B60C 5/20; B60C 7/00; B60C 7/105; B60C 9/005; B60C 9/1807; B60C 9/28; B60C 2011/0033; B60C 23/085; B60C 25/0548; B60C 25/185; B60C 7/107; B60C 9/22
USPC .............................................. 73/146–146.8
See application file for complete search history.

(56) References Cited

U.S. PATENT DOCUMENTS

| | | | |
|---|---|---|---|
| 6,092,028 A * | 7/2000 | Naito | ................. B60C 23/061 702/47 |
| 6,232,875 B1 | 5/2001 | DeZorzi | |
| 6,453,736 B1 | 9/2002 | Straub | |
| 6,945,103 B1 | 9/2005 | Lee et al. | |
| 7,394,357 B2 | 7/2008 | Kurata | |
| 8,011,237 B2 | 9/2011 | Gao et al. | |
| 8,063,756 B2 | 11/2011 | Watabe | |
| 10,821,787 B2 * | 11/2020 | Patel | .................. B60C 23/009 |
| 2004/0064219 A1 | 4/2004 | Mancosu et al. | |
| 2005/0204806 A1 | 9/2005 | Busarosco | |
| 2006/0158324 A1 | 7/2006 | Kramer | |
| 2006/0249323 A1 | 11/2006 | Kurata | |
| 2007/0095446 A1 | 5/2007 | Mancosu et al. | |
| 2008/0061625 A1 | 3/2008 | Schmitt et al. | |
| 2008/0110250 A1 | 5/2008 | Jones | |
| 2008/0243327 A1 | 10/2008 | Bujak et al. | |
| 2009/0072958 A1 | 3/2009 | Hammerschmidt et al. | |
| 2009/0229358 A1 | 9/2009 | Jongsma | |
| 2010/0256874 A1 | 10/2010 | Carresjo | |
| 2010/0274441 A1 | 10/2010 | Carresjo | |
| 2010/0274607 A1 | 10/2010 | Carresjo | |
| 2011/0254678 A1 | 10/2011 | Sun et al. | |
| 2014/0326062 A1 | 11/2014 | Weston | |
| 2015/0165835 A1 | 6/2015 | Peine | |
| 2015/0241313 A1 | 8/2015 | Kraus | |

(56) References Cited

U.S. PATENT DOCUMENTS

2017/0026722 A1  1/2017  Schwartz
2017/0151964 A1  6/2017  Kim

FOREIGN PATENT DOCUMENTS

WO     2009050020 A1    4/2009
WO     2009070063 A1    6/2009
WO     WO-2016164170 A1 * 10/2016 ........... B60C 23/041

OTHER PUBLICATIONS

Notice of Allowance dated Nov. 30, 2017 for U.S. Appl. No. 15/469,862.
Non-Final Office Action dated Jan. 3, 2020 in connection with U.S. Appl. No. 15/933,759.
Notice of Allowance dated May 12, 2020 in connection with U.S. Appl. No. 15/933,759.

* cited by examiner

FIG 3
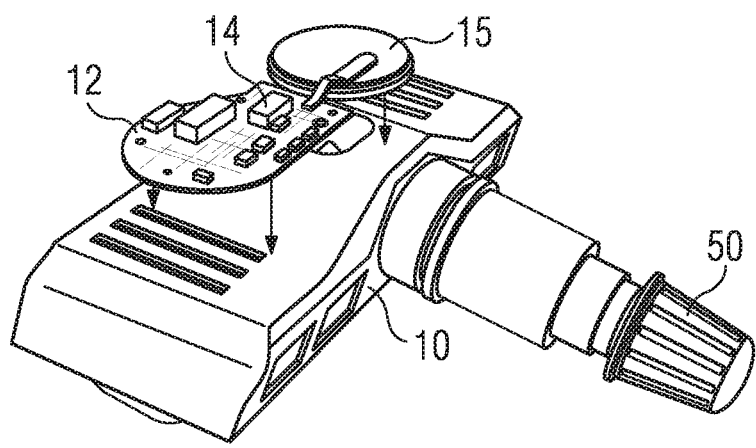
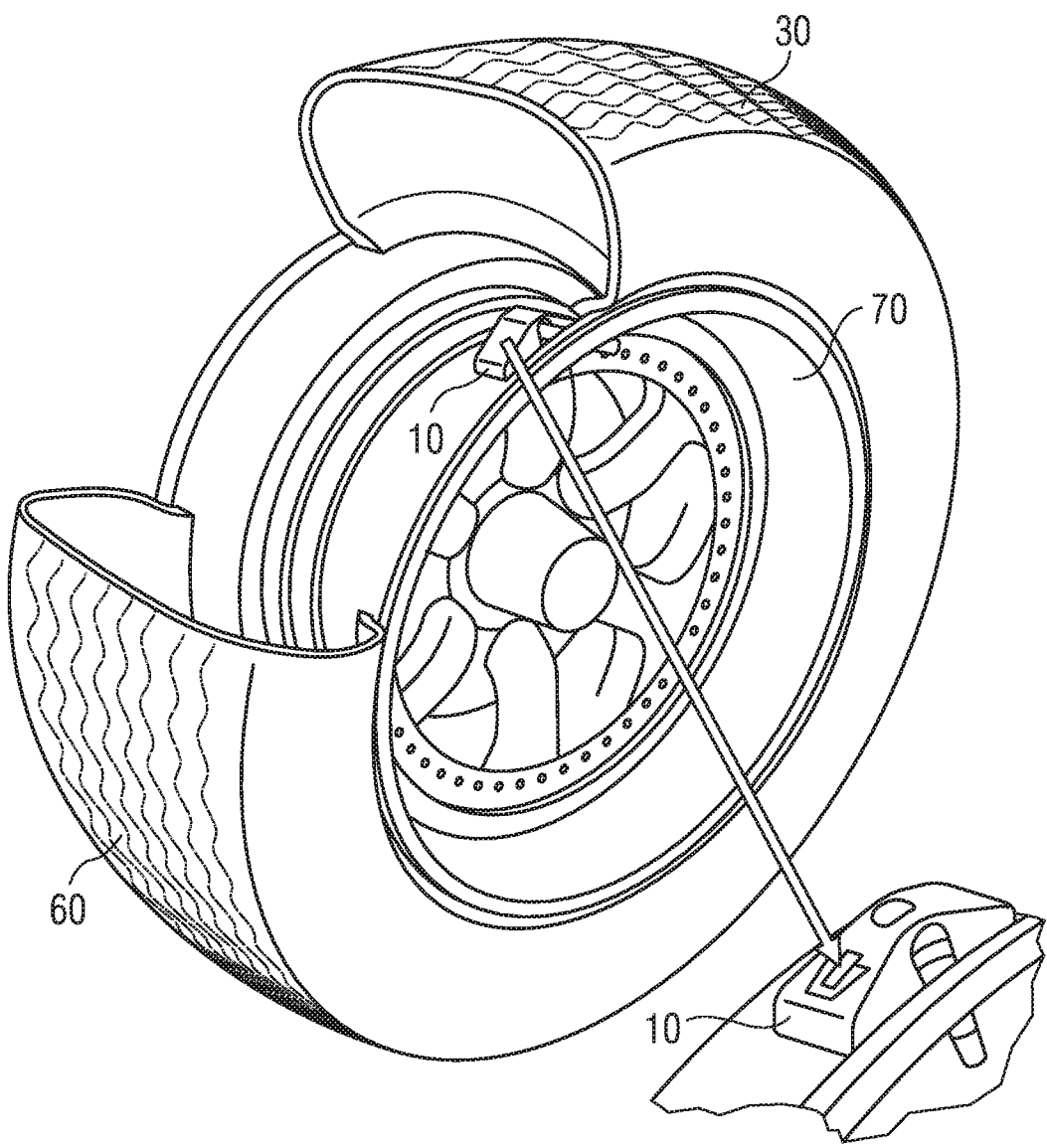

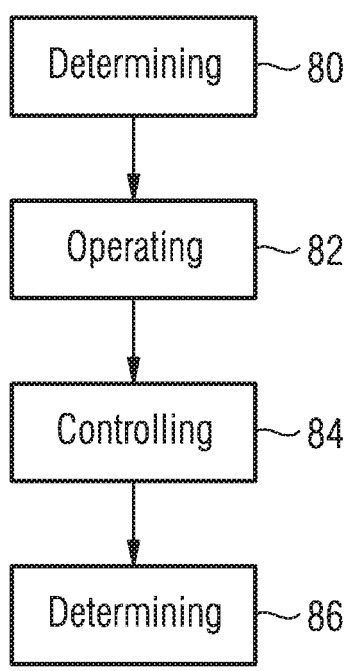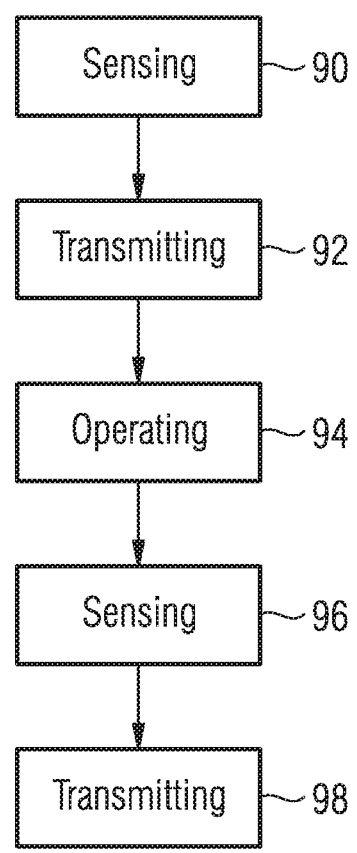

TIRE PRESSURE SENSOR MODULES, TIRE PRESSURE MONITORING SYSTEM, WHEEL, METHODS AND COMPUTER PROGRAMS FOR PROVIDING INFORMATION RELATED TO A TIRE PRESSURE

CROSS REFERENCE TO RELATED APPLICATIONS

This application is a divisional of U.S. patent application Ser. No. 15/933,759 filed Mar. 23, 2018 which is a continuation of U.S. patent application Ser. No. 15/469,862 filed on Mar. 27, 2017, which is a divisional of U.S. patent application Ser. No. 14/802,152 filed on Jul. 17, 2015, now U.S. Pat. No. 9,643,460, issued on May 9, 2017, which claims priority to German Application No. 102014110184.7, filed on Jul. 18, 2014, and incorporated herein by reference in its entirety.

FIELD

Embodiments relate to tire pressure sensor modules, a tire pressure monitoring system, a wheel, methods and computer programs for providing information related to a tire pressure of a wheel of a vehicle.

BACKGROUND

Tire Pressure Monitoring Systems (TPMS) are designed to monitor the air pressure inside of pneumatic tires on various types of vehicles. Therefore pressure sensors are used in the tires and the system may report the tire pressure information to the driver of the vehicle. Wireless transmission can be used to transmit information on the pressure data to a centralized receiver component in the vehicle. Such a configuration can enable the system to report or signal pressure losses of the tires to the driver. Some known TPMSs provide localization information on the tire or wheel on top of pressure information so as to indicate to a driver of a vehicle the position of a wheel having a pressure loss.

Regulations on TPMS requirements become existent in more and more countries. Automotive manufacturers therefore tend to provide TPMS as standard equipment. At least some TPMS are battery powered, where the lifespan of such a battery determines the lifespan of the TPMS. For example, some national regulations require the lifespan of a TPMS to be at least seven years, which may render power efficiency to an important design objective for TPMS, especially when further functionalities, such as additional measurements, are also to be implemented in a TPMS module.

SUMMARY

Embodiments provide pressure modules, a system, a wheel, methods and computer programs for providing information related to a tire pressure of a wheel of a vehicle. Embodiments make use of a separation of a TPMS into two modules, where a first module covers a lower velocity range of the tire and a second module covers a higher velocity range of the tire. Operating the modules in active and in inactive states may allow operating the first module in an energy efficient inactive state above a velocity threshold while the second module may be operated in the active state above the velocity threshold.

Embodiments provide a first tire pressure sensor module configured to provide information related to a pressure of a tire of a vehicle. The first tire pressure sensor module comprises a pressure sensor configured to determine the information related to the pressure of the tire. The first tire pressure sensor module further comprises a controller configured to selectively operate the first pressure module in an active state and in an inactive state, wherein an energy consumption of the first pressure module is lower in the inactive state than in the active state. The controller is further configured to control an output of the information related to the pressure of the tire in the active state. The controller is further configured to operate the first pressure module in the inactive state based on determining that information related to a velocity of the tire indicates a velocity above a threshold. Embodiments may therefore provide a first tire pressure sensor module or TPMS module, which can be operated in an energy efficient mode above a velocity threshold, which may enable energy saving or battery lifetime extension. Such improved energy efficiency may also allow for lower capacity batteries or smaller sized batteries while keeping an expected lifespan or lifetime.

In some embodiments the first tire pressure sensor module may further be configured for valve mounting or it may be comprised in a valve for the tire. Embodiments may therefore provide an energy efficient valve pressure sensor. The first tire pressure sensor module may further comprise a battery. Embodiments may enable an extended battery lifespan or lifetime for a valve mounted pressure module. In further embodiments the first tire pressure sensor module may comprise a rechargeable energy device and a power interface, which is configured to charge the rechargeable energy device. Moreover, embodiments may provide a first tire pressure sensor module, which comprises a rechargeable energy device, such that a lifespan or lifetime of the tire pressure sensor module may be further extended through recharging, which may in particular be advantageous for valve mounted tire pressure sensor modules as its battery may last longer, may be of smaller size and/or lighter weight, respectively. In some embodiments the power interface may be configured to be coupled with another or a second pressure sensor module. The other tire pressure sensor module may then be configured to charge the rechargeable energy device through the interface. Embodiments may enable recharging of a first tire pressure sensor module through a second tire pressure sensor module.

Embodiments further provide a second tire pressure sensor module, which is configured to provide information related to a pressure of a tire of a vehicle. The second tire pressure sensor module comprises a pressure sensor configured to determine the information related to the pressure of the tire. The second tire pressure sensor module further comprises an energy harvester, which is configured to supply power to the tire pressure sensor module. The second tire pressure sensor module further comprises a controller configured to operate the second tire pressure sensor module in an active state and in an inactive state. An energy consumption of the second tire pressure sensor module is lower in the inactive state than in the active state. The controller is further configured to control an output of the information related to the tire pressure in the active state. The controller is further configured to operate the second tire pressure sensor module in the active state based on determining that information related to a velocity of the tire indicates a velocity above a threshold. Embodiments may provide a tire pressure sensor module, which provides or controls the output of information related to a tire pressure above a velocity threshold of a tire and may be operated in an energy efficient mode below said threshold.

In some embodiments the second tire pressure sensor module may be configured for wall or tread mounting inside the tire. Embodiments may provide a tire mounted or in-tire TPMS or tire pressure sensor module, which provides information related to a tire pressure above a velocity threshold for the tire. In embodiments, the second tire pressure sensor module may hence use energy generated through the movement or deformations of the tire and use said energy as a power supply. In some embodiments the second tire pressure sensor module may hence be operated without a battery. In further embodiments the second tire pressure sensor module may further comprise an interface configured to supply power to another tire pressure sensor module. In other words, the second tire pressure sensor module may be able to power itself and another tire pressure sensor module when the tire velocity is above the threshold. Embodiments may hence provide an operating mode, in which the system is power supplied from the motion of the tire above the threshold, such that the system is operated without relying on any other permanent energy supply such as a battery. In some embodiments the second tire pressure sensor module may further comprise a sensor configured to determine information related to a dynamic driving condition of the vehicle. The second tire pressure sensor module may allow taking further measurements relating to the dynamic driving condition of the tire or a vehicle the tire is attached to.

In some embodiments the controller may be further configured to determine the information related to the dynamic driving condition of the vehicle using the sensor when the tire pressure sensor module is in active state. In other words, above the velocity threshold the second tire pressure sensor module may allow taking additional measurements, e.g. using power supplied through the motion of the vehicle or tire and possibly also charging another pressure module. For example, the sensor may be configured to determine information related to at least one element of the group of a temperature of the tire, a dynamic behavior of a contact area of the tire, a shape of the contact area of the tire, a pressure distribution of the contact area of the tire, a deformation of the contact area of the tire, or an acceleration of the tire.

Embodiments further provide a system for determining information related to a pressure of a tire comprising a first tire pressure sensor module as described above and a second tire pressure sensor module as described above. Embodiments provide a tire pressure monitoring system, which comprises a first pressure sensor module at a first location of a tire, and which comprises a second pressure sensor module at a second location of the tire different from the first location. The second pressure sensor module is powered by an energy harvester. The TPMS system is configured to transmit, in a first rotating state of the tire, pressure information sensed by the first pressure sensor module to an electronic control unit and, in a second rotating state of the tire, pressure information sensed by the second pressure sensor module to the electronic control unit. In some embodiments the second pressure sensor module may be powered by an energy harvester. Alternatively or additionally, the second pressure sensor module may be mounted inside of the tire.

Embodiments further provide a wheel for a vehicle comprising a tire and a system for determining information related to a pressure of the tire according to the above. In some embodiments the first tire pressure sensor module may be configured to provide information related to a tire pressure in a first lower velocity range of the wheel and the second tire pressure sensor module may be configured to provide information related to a tire pressure in a second higher velocity range. In embodiments there may be some overlap of the first and second velocity ranges of the tire. Hence, in some embodiments in the lower velocity range the first tire pressure sensor module may provide the information related to the pressure of the tire and in the second velocity range, where energy may be supplied through an energy harvester using the motion of the tire, the information related to the tire pressure may be provided by the second tire pressure sensor module. Embodiments may hence provide a concept or system for determining information related to a tire pressure with improved energy efficiency, or with reduced overall power need with respect to a battery. In some embodiments the first velocity range of the wheel starts at or above zero velocity. In other words, a first battery powered tire pressure sensor module may cover a lower velocity range between zero or standstill of the tire and a velocity threshold and the second tire pressure sensor module may cover a higher velocity range starting at a velocity greater than zero, covering the threshold in case of overlap, and up to the highest velocities of the tire, the vehicle the tire is attached to, respectively.

Embodiments further provide a method for providing information related to a pressure of a tire of a vehicle. The method comprises sensing the information related to the pressure of the tire and selectively operating in an active state and in an inactive state. Energy consumption is lower in the inactive state than in the active state. The method further comprises controlling an output of information related to the tire pressure in the active state. The method further comprises operating in the inactive state based on determining that information related to a velocity of the tire indicates a velocity above or below a threshold.

Embodiments further provide a method, which comprises sensing a tire pressure with a first sensor module mounted at a first location of a tire, and transmitting first tire pressure information based on the sensing of the tire pressure with the first sensor module to an electronic control unit at least in a first time interval. The method further comprises operating the first sensor module in an inactive state at least in a second time interval, and sensing the tire pressure at least during the second time interval with a second sensor module. The second sensor module is mounted at a second location of the tire, wherein the second location is different from the first location. The method further comprises transmitting second tire pressure information based on the sensing of the tire pressure with the second sensor module to an electronic control unit at least during the second time interval. The second sensor module may be powered by an energy harvester and/or the second sensor module may be mounted inside of the tire.

Embodiments further provide a computer program having a program code on a non-transitory media for performing, when the computer program is executed on a computer or on a processor, a method for providing information related to a pressure of a tire of a vehicle, as described above. In general, embodiments also provide one or more computer programs having a program code for performing one or more of the above described methods, when the computer program is executed on a computer, processor, or programmable hardware component. A further embodiment is a computer readable storage medium storing instructions which, when executed by a computer, processor, or programmable hardware component, cause the computer to implement one of the methods described herein.

Embodiments further provide a vehicle comprising such a system as described above.

BRIEF DESCRIPTION OF THE DRAWINGS

Some other features or aspects will be described using the following non-limiting embodiments of apparatuses and/or methods and/or computer programs by way of example only, and with reference to the accompanying figures, in which

FIG. 3 shows an embodiment of a first pressure sensor module for valve mounting;

FIG. 5 depicts a flow chart of an embodiment of a method for determining information related to a tire pressure; and FIG. 6 depicts a flow chart of another embodiment of a method.

DETAILED DESCRIPTION

In the following some components will be shown in multiple figures, where consistent reference signs refer to functionally identical or similar components. Repetitive descriptions may be avoided for simplicity purposes. Features or components depicted in dotted lines are optional.

Accordingly, while example embodiments are capable of various modifications and alternative forms, embodiments thereof are shown by way of example in the figures and will herein be described in detail. It should be understood, however, that there is no intent to limit example embodiments to the particular forms disclosed, but on the contrary, example embodiments are to cover all modifications, equivalents, and alternatives falling within the scope of the invention. Like numbers refer to like or similar elements throughout the description of the figures.

As used herein, the term, "or" refers to a non-exclusive or, unless otherwise indicated (e.g., "or else" or "or in the alternative"). Furthermore, as used herein, words used to describe a relationship between elements should be broadly construed to include a direct relationship or the presence of intervening elements unless otherwise indicated. For example, when an element is referred to as being "connected" or "coupled" to another element, the element may be directly connected or coupled to the other element or intervening elements may be present. In contrast, when an element is referred to as being "directly connected" or "directly coupled" to another element, there are no intervening elements present. Similarly, words such as "between", "adjacent", and the like should be interpreted in a like fashion.

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" or "including," when used herein, specify the presence of stated features, integers, steps, operations, elements or components, but do not preclude the presence or addition of one or more other features, integers, steps, operations, elements, components or groups thereof.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Figure 1:
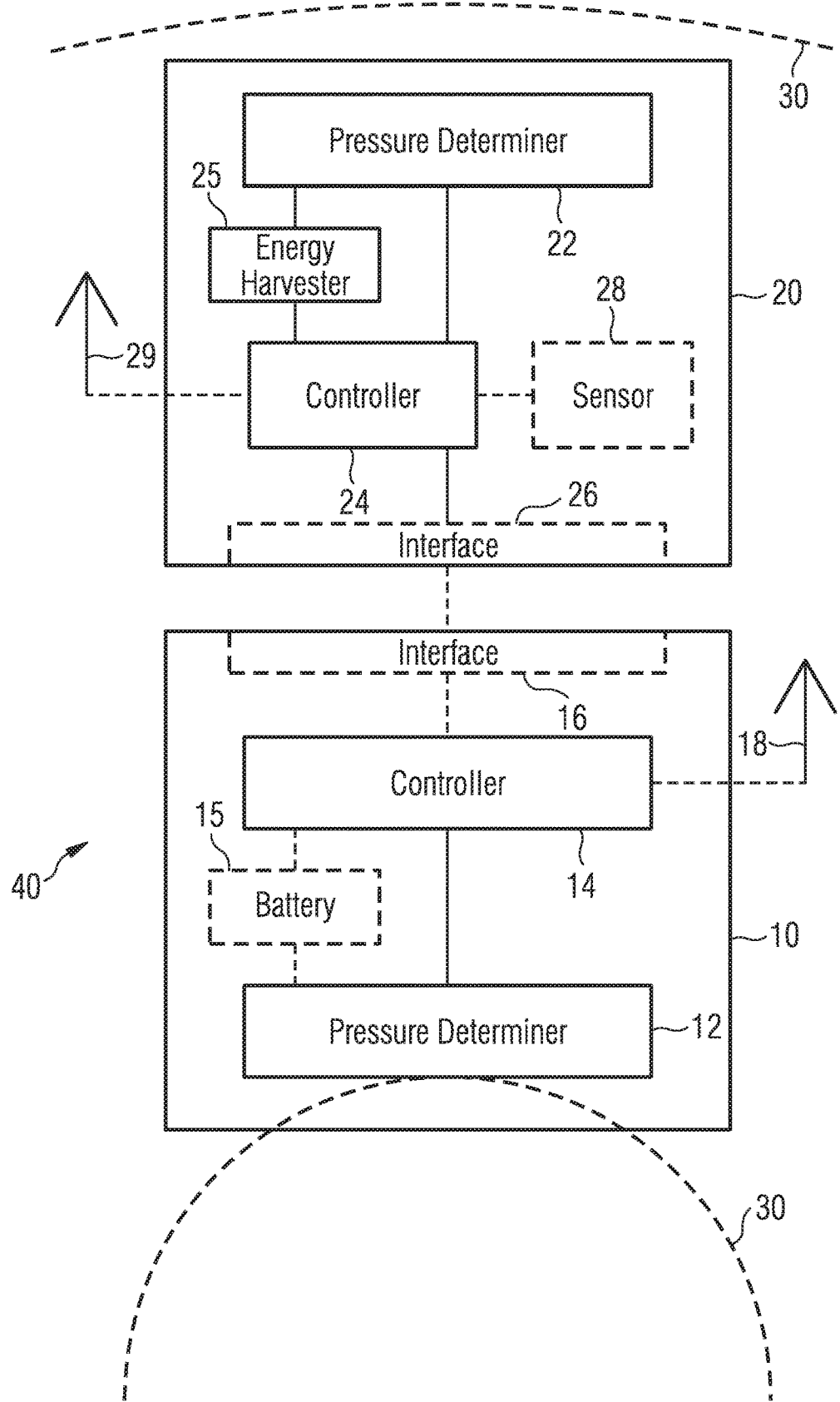
FIG. 1 shows block diagrams of embodiments of a first and a second pressure sensor module.

FIG. 1 illustrates an embodiment of a first pressure sensor module 10 configured to provide information related to a pressure of a tire 30 of a vehicle. In the following a vehicle can be any vehicle using tires, as, for example, a car, a van, a truck, a bus, a plane, a bike, a motorbike, etc. Although, some embodiments may be exemplified using a car, any other vehicle can be utilized in embodiments. The tire 30 is outlined as a sketch in FIG. 1. The first tire pressure sensor module 10 may be located next to the inner opening of the tire 30, i.e. close to a potential rim of the vehicle. The first tire pressure sensor module 10 comprises a pressure sensor 12, which is configured to determine the information related to the pressure of the tire 30. The pressure sensor 12 may comprise one or more pressure sensing elements, one or more pressure detectors, one or more pressure units, etc. The pressure sensor 12 may be configured to determine any signal or information, which may be analog or digital, related to the pressure of its surrounding, for example of the tire 30, when the pressure sensor 12 is mounted or coupled thereto.

The first pressure sensor module 10 comprises a controller 14, which is configured to selectively operate the first pressure sensor module 10 in an active state and in an inactive state. An energy consumption of the first pressure sensor module 10 is lower in the inactive state than in the active state. In other words the controller 14 is configured to control the first pressure sensor module 10 and the controller 14 is coupled with the pressure sensor 12. The controller 14 may hence receive, control or obtain information related to the tire pressure from the pressure sensor 12. The controller 14 is further configured to control an output of the information related to the pressure of the tire 30 in the active state. The controller 14 may optionally comprise a transmitter 18, which is exemplified in FIG. 1 as a transmit antenna. The transmitter 18 may be configured to wirelessly transmit information related to the pressure of the tire 30 to, for example, a control unit of a vehicle or service station, for example an Electronic Control Unit (ECU). The transmitter 18 may be implemented as or comprise one or more modules, devices, or units comprising transmitter or transceiver components such as typical transmitter and/or receiver components. Such components may include one or more components of the group of one or more transmit and/or receive antennas, one or more transmit and/or receive loops or coils, one or more low noise amplifiers, one or more power amplifiers, one or more filters, one or more duplexers or diplexers, one or more analog-digital and/or digital-analog converters, etc. In embodiments the tire pressure sensor module 10 may be implemented as TPMS sensor and may be referred to as TPMS sensor or module 10.

The tire pressure sensor module 10 may hence wirelessly communicate with a receiver module, located outside the tire 30 or wheel, for example an Electronic Control Unit (ECU) of a vehicle. In the embodiment depicted in FIG. 1 the controller 14 is further configured to control an output of or determine information related to a velocity of the tire 30. In embodiments the controller 14 may comprise or be coupled to a sensor, which may, for example in terms of an acceleration sensor, determine such information related to the velocity, for example represented by one or more signals comprising information related to speed, rotational frequency, radial or tangential acceleration, etc. of the tire 30.

In embodiments the velocity of the tire may be represented by a rotational speed of the tire or wheel, or a speed of the center of the tire (e.g. the speed of the vehicle). The velocity may be obtained, determined or measured by means of a sensor, e.g. a tangential or radial acceleration sensor. In some embodiments the information related to the velocity may be determined using an output signal of an energy harvester. For example, the output power or output voltage of an energy harvester may depend on the rotational speed of the tire 30, a roughness of an underlying surface, respectively. Hence, a level of an output signal of an energy harvester may indicate information related to the velocity of the tire. The controller 14 may be configured to operate the pressure module 10 in the inactive state based on determining that the information related to the velocity of the tire indicates a velocity above a threshold. In some embodiments, the controller 14 may be configured to operate the tire pressure sensor module 10 in the inactive state if the information related to the velocity of the tire indicates a velocity above a threshold. In embodiments a switching to the inactive state may be carried out when the velocity threshold is exceeded, with a possible delay, respectively.

In some embodiments, when the velocity of the tire 30 reaches a certain threshold, the controller 14 may switch the first pressure module 10 to an inactive state, which is more energy efficient than the active state. It is to be noted that generally an operating mode or state of a tire pressure module may correspond to an alternation between a state in which tire pressure information can be obtained and communicated and another more energy efficient state, in which no tire pressure information is communicated. It is to be noted that in embodiments a pressure module may be operated in the active state, in which it may be switched back an forward between a measurement mode and an energy saving mode such that pressure information is made available on a certain time basis, e.g. every 10 ms, 20 ms, 50 ms, 100 ms, 200 ms, 500 ms, 1 s, 2 s, 5 s, etc. It is to be noted that in some embodiments a switching between the measurement mode and the energy saving mode may still take place in the inactive state, for example, more rarely than in the active state such that the energy consumption in the inactive state becomes lower.

In some embodiments the controller 14 may be configured to wait a certain time period when the threshold is reached or exceeded before switching the first tire pressure sensor module 10 to the inactive state to assure that the velocity remains above the threshold for the time period. In an embodiment the control module 14 may be configured to wait for the time period thereby assuring that the velocity has reached or exceeded the threshold for more than the time period and then switch the first tire pressure sensor module 10 to the inactive state. As has been mentioned above the threshold may correspond to a certain output level of an energy harvester, which is indicative of the velocity of the tire. The inactive state may correspond to a standby state, a dormant state, a hibernation state, etc. In the inactive state the first tire pressure sensor 10 might not be able to provide the information related to the pressure of the tire 30, or more rarely than in the active state. In some embodiments, a transmitter within the first pressure sensor module 10 may be switched to an inactive state such that the tire pressure information is no longer transmitted to an ECU. In some embodiments, the indication that the velocity is above a threshold may be combined with other criteria to determine the switching of the first tire pressure sensor module 10 into the inactive state. For example, the first tire pressure sensor module 10 may be switched to the inactive state when the velocity is continuously above a threshold for a predetermined time. Other criteria may be used for determining the switching of the first tire pressure sensor module 10 into the inactive state.

In some embodiments the first tire pressure sensor module 10 may comprise a battery 15 as a power supply, which may be coupled to one or more components of the first tire pressure sensor module 10. The pressure module 10 may use energy from said battery 15 during active state or when the information related to the velocity of the tire 30 indicates a velocity below the threshold. In other words power supply for the first tire pressure sensor module 10 is provided by the battery 15. Two opposing design goals may be taken into account when dimensioning such a battery 15. First, the battery 15 may correspond to a significant cost contributor for the first tire pressure sensor module 10 or TPMS module. Furthermore, the battery 15 may correspond to a significant weight contributor for the first tire pressure sensor module 10 or TPMS module. The heavier the first tire pressure sensor module 10 or TPMS module the more complex becomes a mounting in the wheel, e.g. at a valve of the wheel. For these reasons a smaller, lighter TPMS module or less expensive batteries may be desirable.

Second, a larger battery 15 may provide a longer operational time, lifespan or lifetime of the first tire pressure sensor module 10 or TPMS module. Furthermore, exact pressure measurements may consume more energy than less exact ones and additional measurements, e.g. acceleration, temperature, etc. may consume additional energy from the battery 15. From research and development perspective there may be a desire for a more accurate monitoring of the tire parameters, for example, for safety or comfort reasons. Hence additional measurements, such as measurements with respect to a dynamic driving condition, may be desirable, but each additional measurement may consume additional energy. Therefore, a larger or higher capacity battery 15 may be desirable.

Embodiments may enable a more energy efficient concept for a TPMS. FIG. 1 also illustrates an embodiment of the second tire pressure sensor module 20 or TPMS module. The second tire pressure sensor module 20 is also configured to provide information related to a pressure of the tire 30 of a vehicle. The second pressure module 20 comprises a pressure sensor 22, which is configured to determine the information related to the pressure of the tire 30. The pressure sensor 22 may be implemented in line with the above described pressure sensor 12. As outlined above, the second tire pressure sensor module 20 further comprises an energy harvester 25 configured to supply power to the tire pressure sensor module 20.

The second tire pressure sensor module 20 further comprises a controller 24, which is configured to operate the second tire pressure sensor module 20 in an active state and in an inactive state. An energy consumption of the second tire pressure sensor module 20 is lower in the inactive state than in the active state. The controller 24 may be implemented in line with the above controller 14 and may as well be configured to provide the information related to the tire pressure to a control unit of the vehicle or service station, for example, using an optional transmitter 28 in line with the above. The controller 24 may be configured to provide or control an output of the information related to the tire 30 pressure in the active state and the controller may be configured to determine information related to a velocity of the tire 30. The controller is configured to operate the tire pressure sensor module 20 in the active state based on determining that the information related to the velocity of the tire indicates a velocity above a threshold, which may be the same or a different threshold as the threshold of the first tire pressure sensor module 10.

As it is implied by FIG. 1 the first tire pressure sensor module 10 may be configured for valve mounting or being comprised in a valve of the tire 30. The second tire pressure sensor module 20 may be configured for wall or tread mounting inside the tire 30. The second tire pressure sensor module may comprise an energy harvester 25 configured to supply power to the second tire pressure sensor module 25 or TPMS module. The second tire pressure sensor module 20 may be equipped with an energy harvester or a nano generator and may be a battery-free TPMS sensor, which converts mechanical energy of the pulse when the TPMS sensor hits the ground into an electrical signal from which energy and other information may be determined, for example, information on a rotational frequency of the wheel can be determined. In further embodiments the second tire pressure sensor module 20 may use an acceleration or shock sensor to determine the information on the rotational frequency of the wheel, e.g. by making use of gravity.

The second tire pressure sensor module 20 may be mounted inside the tire 30 and may use the energy harvester 25 as power supply. For example, the energy harvester 25 may be mounted inside the tire on the backside of a contact area of the tire 30. The surface of the tire 30 is exposed to deformations at the contact area with the underground, e.g. it is compressed when entering the contact area and decompressed when exiting the contact area. These deformations are also existing on the inside of the tire. The energy harvester 25 may convert this mechanical energy into electrical energy, which is then used to power supply the second pressure module 20. For example, the energy harvester 25 may comprise a piezoelectric element to convert the mechanical energy into the electrical energy. At higher velocities the energy harvester 25 may provide enough energy to carry out further measurements, as will be detailed subsequently. However, if the velocity of the tire 30 is rather low for certain periods of time, then not enough energy may be available from the harvester 25, which may, for example, occur in a stop-and-go section in downtown traffic or when starting the vehicle after a period of standstill. As regulations might not allow longer periods without pressure measurements, they may set certain restrictions on the time period during which a failure has to be indicated, respectively, a concept based on an energy harvester alone could be seen critical. The energy harvester 25 may comprise another source of energy, which however contributes to costs, weight, and fragility of the harvester, in particular when mounted on the inside of the contact area.

If an energy harvester is equipped with an additional energy source, e.g. a battery or accumulator, additional components or circuits may be necessary to provide switching, charging or controlling functionality for the energy sources and, for example, for stabilizing the supply voltage. Such additional components may consume further space and may further contribute to the costs. Space could be seen as another critical factor for an in-tire module, as the larger such a module, the higher are forces exerted by compression and decompression of the contact area as well as centrifugal forces. Moreover, an energy harvester might not comply with the needs for a valve mountable pressure module, as weight and room requirement for valve mounting would demand limited force exerted onto the valve. Such room would be available on the inside of the tire 30, but stresses and strain are high such that it may be preferred not to use large electronic circuits and/or batteries in such areas.

Embodiments may provide a combination of both of these concepts, where pressure modules are used for different velocity ranges. FIG. 1 further illustrates an embodiment of a system 40 for determining information related to a pressure of a tire 30. The system 40 comprises the first tire pressure sensor module 10 and the second tire pressure sensor module 20. The system 40 combines the two tire pressure sensor modules 10 and 20. The combination may provide information related to the tire pressure in almost all or all driving conditions and may even allow for additional measurements, for example, relating to the driving dynamics of the vehicle at higher velocities. Another embodiment is a wheel for a vehicle comprising a tire 30 and a system 40 for determining information related to a pressure of the tire 30.

Figure 2:
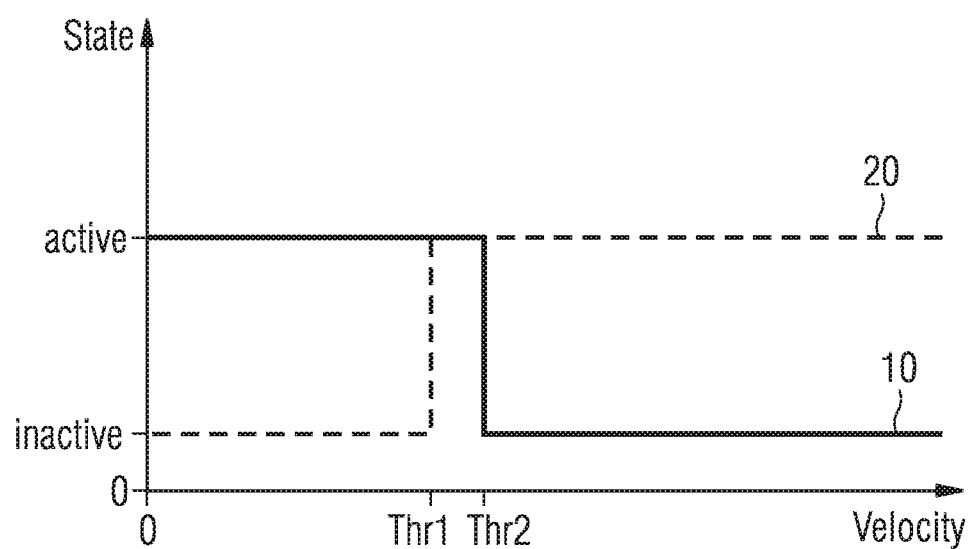
FIG. 2 illustrates a view chart on state changes in an embodiment.

The state switching is further depicted in FIG. 2. FIG. 2 illustrates a view chart on state changes in the embodiment of the system 40 as depicted in FIG. 1. The view chart shows the velocity of the tire 30 on the abscissa and the respective operational state on the ordinate. As can be seen from FIG. 2, at zero velocity the first tire pressure sensor module 10 is active (solid line) and the second tire pressure sensor module 20 is inactive (broken line). At a first threshold Thr1 the second tire pressure sensor module 20 is activated and changes to active state. It can be assumed that at Thr1 the energy harvester 25 provides sufficient energy for the second tire pressure sensor module 20 to reliably sense the tire pressure and provide the information on the tire pressure. At the second threshold Thr2 the first tire pressure sensor module 10 changes from active state to inactive state and battery power can be saved at velocities higher than Thr2. It is to be noted that FIG. 2 shows some overlap between Thr1 and Thr2 in which both pressure modules 10 and 20 are in active state, which is an example. Such a behavior may be used when there is not further link, coupling or communication between the two modules 10 and 20 and an overlap may assure that there is always at least one pressure module 10 or 20 active. Furthermore, an overlapping regime in which both pressure modules 10 and 20 are operating concurrently may be used for evaluating the sensed pressure information from both pressure modules in order to check whether both pressure modules are functioning correctly. Thus, the two pressure modules may be used to enhance functional safety for the tire pressure monitoring.

As outlined above. a link, coupling or communication between the two modules 10 and 20 may be provided, e.g. by means of communicating controllers 14 and 24, by means of a common controller, respectively, there may as well be only a single threshold still assuring that one module 10 or 20 is active at any velocity. Moreover, it is also conceivable that in some embodiments a small gap is tolerated, i.e. certain velocities at which both modules 10 and 20 are inactive.

In the embodiment illustrated by FIG. 2 the first tire pressure sensor module 10 is configured to provide information related to a tire pressure in a first lower velocity range 0-Thr2 of the wheel and the second tire pressure sensor module 20 is configured to provide information related to a tire pressure in a second higher velocity range Thr1-maximum velocity of the vehicle or even above. As shown in FIG. 2 the first velocity range of the wheel starts at or above zero velocity, hence, the first tire pressure sensor module 10 may be used after a standstill of the vehicle. It is to be noted that the first tire pressure sensor module 10 may be operated in the inactive state if the velocity of the tire equals zero for a certain time period. In other words, in embodiments the first tire pressure sensor module 10 might not stay in active state when the vehicle is parked. For example, the controller 14 may be configured to operate the first tire pressure sensor module 10 in inactive state based on determining that the information related to the velocity of the tire indicates zero velocity for a certain time-out period. The controller 14 may further be configured to operate the first tire pressure sensor module 10 in active state again, once the tire starts moving or when the information related to the velocity of the tire indicates a velocity greater than zero. For example, the controller 14 may transit the tire pressure sensor module 10 to active state if the velocity of the tire is slightly above zero, e.g. at zero+. The system 40 may combine a valve mounted tire pressure sensor module 10 with an in-tire pressure sensor module. Information related to tire pressure may be provided at any velocity.

FIGS. 1 and 2 illustrate a tire pressure monitoring system 40, which comprises a first pressure sensor module 10 at a first location of a tire 30, e.g. at the valve or rim. The tire pressure monitoring system 40 further comprises a second pressure sensor module 20 at a second location of the tire 30 different from the first location, e.g. in the tire 30. The second pressure sensor module 20 is powered by an energy harvester 25. The tire pressure monitoring system 40 is configured to transmit, in a first rotating state of the tire 30, pressure information sensed by the first pressure sensor module 10 to an electronic control unit and, in a second rotating state of the tire 30, pressure information sensed by the second pressure sensor module 20 to the electronic control unit. Another embodiment is a wheel 60 for a vehicle comprising a tire 30 and a system 40 for determining information related to a pressure of the tire 30. In line with the above, the first pressure sensor module 10 may be configured to provide information related to a tire pressure in a first lower velocity range of the wheel 60 and the second pressure sensor module 20 may be configured to provide information related to a tire pressure in a second higher velocity range. The first velocity range of the wheel may start at or above zero velocity.

As further shown in FIG. 1 the second tire pressure sensor module 20 may optionally further comprise a sensor 28, which is configured to determine information related to a dynamic driving condition of the vehicle. Such information may as well be provided when the second tire pressure sensor module 20 is in active state. In other words, in another embodiment the controller 24 is further configured to determine the information related to the dynamic driving condition of the vehicle using the sensor 28, when the second tire pressure sensor module 20 is in active state. The sensor 28 may be configured to determine information related to at least one element of the group of a temperature of the tire, a dynamic behavior of a contact area of the tire, a shape of the contact area of the tire, a pressure distribution of the contact area of the tire, a deformation of the contact area of the tire, or an acceleration of the tire.

Embodiments may provide improved system efficiency by operating the two systems in improved or optimized areas of operation. From a standstill of the vehicle up to a threshold the first tire pressure sensor module 10, which may correspond to a valve mounted pressure module, provides the information related to the tire pressure. As the first tire pressure sensor module 10 is inactive above the threshold a smaller battery may be used, the lifespan extended, respectively. Above the threshold the energy harvester 25 provides enough energy to operate the second tire pressure sensor module 20, which may correspond to an in-tire module. Additionally, the second tire pressure sensor module 20 may carry out further measurements and provide information related thereto by means of the controller 24. If the velocity decreases below the threshold the first tire pressure sensor module 10 may take over again.

FIG. 3 shows an embodiment of a first tire pressure sensor module 10 for valve mounting. FIG. 3 shows on the left hand side a valve 50, which comprises a first tire pressure sensor module 10. FIG. 3 illustrates the pressure sensor 12, the controller 14 and the battery 15. On the right hand side FIG. 3 shows a wheel 60 with a rim 70 and a tire 30. The first tire pressure sensor module 10 is mounted on the rim together with the valve 50 as shown on the left hand side. In a conventional configuration the battery may consume about 50% of the room of such a module and may make up about 50% of its weight. Embodiments may allow using the first tire pressure sensor module 10 only partially during a drive at lower velocities, e.g. only when the vehicle moves slower than 20 km/h, which allows for a corresponding size and weight reduction of the battery.

Furthermore, a series of pressure measurements may be carried out in order to statistically compensate for pressure variations (average out pressure variations) occurring in the tire. These pressure variations may occur due to strikes and hits the tire takes from the underground, which increase with increasing speed of the vehicle. At lower velocities lower variations can be expected, such that even further energy may be saved in embodiments. Assuming that a vehicle spends 50% in each of the velocity range sections as depicted in FIG. 2 (50% first pressure module 10 only, 50% second pressure module 20 only, Thr1=Thr2—no overlap) the battery 15 capacity could be also reduced by 50% without lowering the lifetime of the first pressure module 10. A smaller battery may enable a smaller and lighter weight overall pressure module 10 design, which may in turn enable a less complex mounting at/with the valve 50. The overall costs for the first pressure module 10 may be decreased. In other embodiments, the battery 15 size may be left unchanged but the lifetime or lifespan of the first pressure module 10 may be increased to 15 to 20 years, which would correlate to an average expected lifetime or life span of a vehicle.

Figure 4:
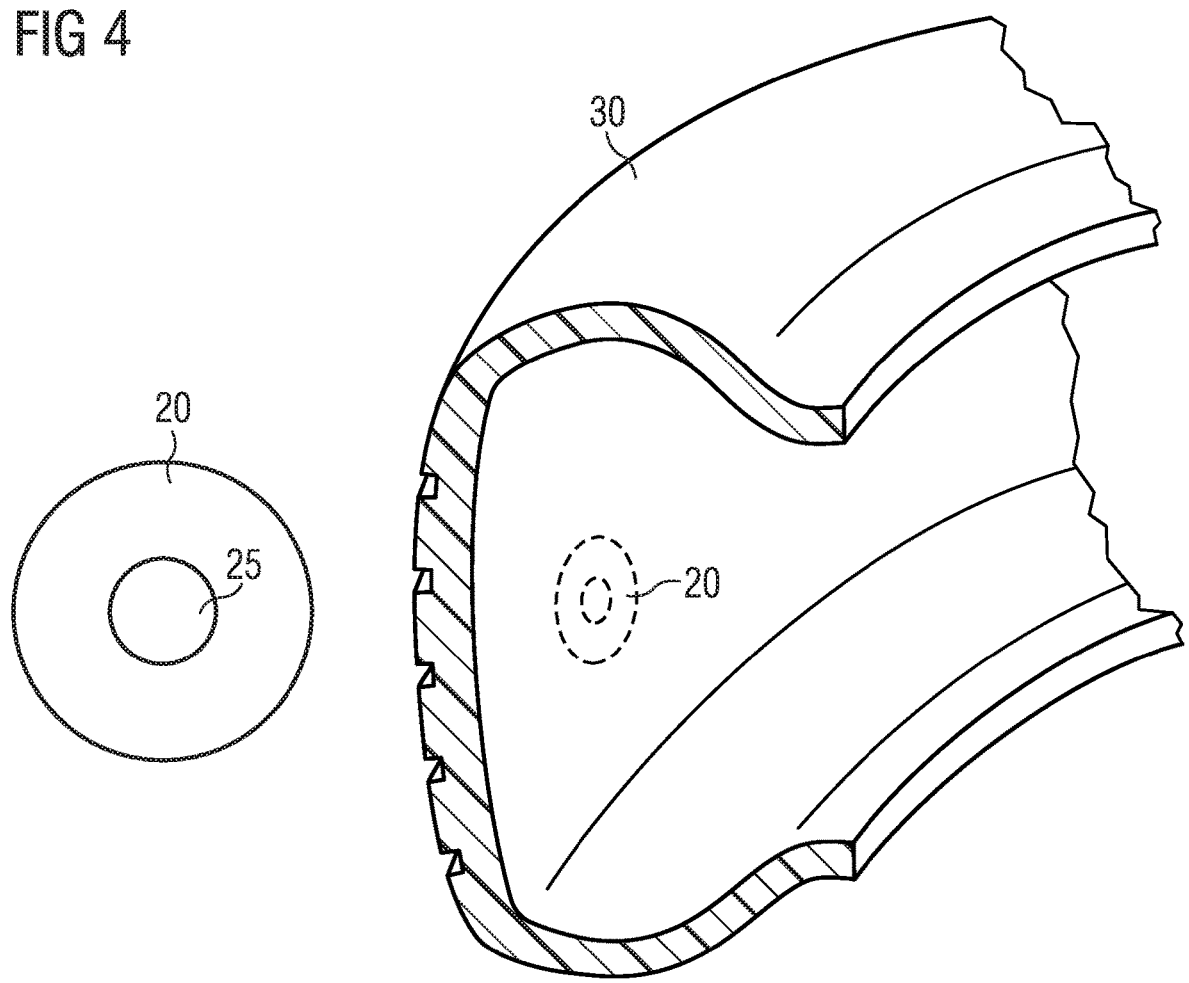
FIG. 4 shows an embodiment of a second pressure sensor module for tire mounting.

FIG. 4 shows an embodiment of a second tire pressure sensor module 20 for in-tire mounting. FIG. 4 shows on the right hand side a part of a tire 30, which comprises the second tire pressure sensor module 20. On the left hand side, FIG. 4 depicts a magnification of the second tire pressure sensor module 20 which has a circular shape and includes a piezo element as energy harvester 25. When the second tire pressure sensor module 20 is operated at higher velocities, the energy harvester 25 can provide sufficient energy such that electronic circuits for operating the second tire pressure sensor module 20 may be kept at a lower complexity and size. In some embodiments an output power or output signal level of the energy harvester 25 may be monitored to assure sufficient energy is provided by the energy harvester 25. For example, state switching may be carried out dependent on a sufficient output power or signal level of the energy harvester 25. TPMS functionality above the velocity threshold may therefore be assured. If the velocity rises even further, more energy may be available than necessary for the TPMS operation. The additional energy may be used for further measurements relating to the driving dynamic condition of the tire 30, the wheel 60 or the vehicle, respectively. For example, temperature or acceleration measurements of the tire may be carried out. Moreover, measurements on the contact area (position, stress, strain, pressure distribution, deformation) may be carried out. For example, information related to deformation and position of the contact area and to the pressure distribution may be used to further improve comfort and safety of the vehicle. Such data or information may be measured, pre-processed or processed, and then also provided to a control unit of the vehicle, e.g. by wireless transmission. Such data may especially be useful at higher velocities of the vehicle, which in a synergetic manner correlates with the energy exploitation of the energy harvester 25.

Moreover, embodiments of the system 40 may use a modular structure and the first tire pressure sensor module 10 (e.g. as valve mounted embodiment) may be kept similar for a number of vehicles or vehicle configurations. The second tire pressure sensor module 20 may be adapted to a demand at different vehicles or vehicle configurations, for example, in terms of the kind of energy harvester 25, in terms of the controller 24 or micro controller 24, interfaces, etc.

As shown in FIG. 1 the first and second tire pressure sensor modules 10 and 20 may optionally comprise interfaces 16 and 26, through which they may be coupled. In other words, the first tire pressure sensor module 10 may further comprise a rechargeable energy device and a power interface 16, which is configured to charge the rechargeable energy device. The rechargeable energy device may correspond to an accumulator, a capacitor, etc. The power interface 16 may be configured to be coupled with the second tire pressure sensor module 20 and the second tire pressure sensor module 20 may be configured to charge the rechargeable energy device through the interface 16. The second tire pressure sensor module 20 then further comprises the interface 26, which is configured to supply power to the first tire pressure sensor module 10. Such an interface 16, 26 may correspond to any wireless or wired interface, which allows for such power supply. In some further embodiments the interfaces 16 and 26 may further allow for communicating information between the controllers 14 and 24, for example, to enable a coordination of the velocity thresholds or operating states.

FIG. 5 shows a flow chart of an embodiment of a method for determining information related to a tire pressure. The method comprises determining 80 the information related to the pressure of the tire. The method further comprises selectively operating 82 in an active state and in an inactive state, wherein energy consumption is lower in the inactive state than in the active state. The method further comprising controlling 84 an output of the information related to the tire pressure in the active state. The method further comprises operating 86 in the inactive state based on determining that information related to a velocity of the tire indicates a velocity above or below a threshold.

FIG. 6 depicts a flow chart of another embodiment of a method. The method comprises sensing 90 a tire pressure with a first sensor module 10 mounted at a first location of a tire 30. The method further comprises transmitting 92 first tire pressure information based on the sensing 90 of the tire pressure with the first sensor module 10 to an electronic control unit at least in a first time interval. The method further comprises operating 94 the first sensor module 10 in an inactive state at least in a second time interval and sensing 96 the tire pressure at least during the second time interval with a second sensor module 20. The second sensor module 20 is mounted at a second location of the tire 30 and the second location is different from the first location. The method further comprises transmitting 98 second tire pressure information based on the sensing 96 of the tire pressure with the second sensor module 20 to an electronic control unit at least during the second time interval. In line with the above, the second sensor module 20 may be powered by an energy harvester and/or the second sensor module 20 may be mounted inside of the tire 30.

Another embodiment is a computer program having a program code on a non-transitory media for performing, when the computer program is executed on a computer or on a processor, the above method for providing information related to a pressure of a tire of a vehicle.

A further embodiment is a computer readable storage medium storing instructions which, when executed by a computer, cause the computer to implement one of the methods described herein. Other embodiments are a computer program or a computer program product having a program code for performing anyone of the above described methods, when the computer program or computer program product is executed on a processor, computer, or programmable hardware.

A person of skill in the art would readily recognize that steps of various above-described methods may be performed by programmed computers. Herein, some embodiments are also intended to cover program storage devices, e.g., digital data storage media, which are machine or computer readable and encode machine-executable or computer-executable programs of instructions, wherein said instructions perform some or all of the steps of said above-described methods. The program storage devices may be, e.g., digital memories, magnetic storage media such as magnetic disks and magnetic tapes, hard drives, or optically readable digital data storage media. The embodiments are also intended to cover computers programmed to perform said steps of the above-described methods or (field) programmable logic arrays ((F)PLAs) or (field) programmable gate arrays ((F)PGAs), programmed to perform said steps of the above-described methods.

The description and drawings merely illustrate the principles of the invention. It will thus be appreciated that those skilled in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

Functional blocks denoted as "means for . . . " (performing a certain function) shall be understood as functional blocks comprising circuitry that is adapted for performing or to perform a certain function, respectively. Hence, a "means for s.th." may as well be understood as a "means being adapted or suited for s.th.". A means being adapted for performing a certain function does, hence, not imply that such means necessarily is performing said function (at a given time instant).

The functions of the various elements shown in the Figures, including any functional blocks labeled as "means", may be provided through the use of dedicated hardware, such as "a processor", "a sensor", "a controller" etc. as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller"

should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non-volatile storage. Other hardware, conventional and/or custom, may also be included. Similarly, any switches shown in the Figures are conceptual only. Their function may be carried out through the operation of program logic, through dedicated logic, through the interaction of program control and dedicated logic, or even manually, the particular technique being selectable by the implementer as more specifically understood from the context.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

Furthermore, the following claims are hereby incorporated into the Detailed Description, where each claim may stand on its own as a separate embodiment. While each claim may stand on its own as a separate embodiment, it is to be noted that—although a dependent claim may refer in the claims to a specific combination with one or more other claims—other embodiments may also include a combination of the dependent claim with the subject matter of each other dependent claim. Such combinations are proposed herein unless it is stated that a specific combination is not intended. Furthermore, it is intended to include also features of a claim to any other independent claim even if this claim is not directly made dependent to the independent claim.

It is further to be noted that methods disclosed in the specification or in the claims may be implemented by a device having means for performing each of the respective steps of these methods.

Further, it is to be understood that the disclosure of multiple steps or functions disclosed in the specification or claims may not be construed as to be within the specific order. Therefore, the disclosure of multiple steps or functions will not limit these to a particular order unless such steps or functions are not interchangeable for technical reasons.

Furthermore, in some embodiments a single step may include or may be broken into multiple substeps. Such substeps may be included and part of the disclosure of this single step unless explicitly excluded.

What is claimed is:

1. A tire pressure sensor module, comprising:
   a pressure sensor configured to determine information related to a pressure of a tire;
   a controller configured to selectively operate the tire pressure sensor module in an active state and in an inactive state, wherein an energy consumption of the tire pressure sensor module is lower in the inactive state than in the active state,
   an energy harvester configured to supply power to the tire pressure sensor module; and
   wherein the controller is further configured to control an output of the information related to the pressure of the tire in the active state, and
   wherein the controller is configured to operate the tire pressure sensor module in the inactive state based on determining that information related to a velocity of the tire indicates a velocity above a threshold,
   wherein the information related to the velocity of the tire is received from the energy harvester.

2. The tire pressure sensor module of claim 1, further being configured for valve mounting or being comprised in a valve of the tire.

3. The tire pressure sensor module of claim 1, further comprising a battery operably coupled to the controller.

4. The tire pressure sensor module of claim 1, further comprising a rechargeable energy device operably coupled to the controller and a power interface which is configured to charge the rechargeable energy device.

5. The tire pressure sensor module of claim 4, wherein the power interface is configured to be coupled with another tire pressure sensor module, the another tire pressure sensor module being configured to charge the rechargeable energy device through the power interface.

6. A tire pressure sensor module, comprising:
   pressure sensing means for determining information related to a pressure of a tire;
   controller means for selectively operating the tire pressure sensor module in an active state and in an inactive state, wherein an energy consumption of the tire pressure sensor module is lower in the inactive state than in the active state,
   energy harvesting means for supplying power to the tire pressure sensor module;
   wherein the controller means is further for controlling an output of the information related to the pressure of the tire in the active state,
   wherein the controller means is further for operating the tire pressure sensor module in the inactive state based on determining that information related to a velocity of the tire indicates a velocity above a threshold, and
   wherein the information related to the velocity of the tire is received from the energy harvesting means.

7. The tire pressure sensor module of claim 6, further being configured for valve mounting or being comprised in a valve of the tire.

8. The tire pressure sensor module of claim 6, further comprising a battery operably coupled to the controller means.

9. The tire pressure sensor module of claim 6, further comprising a rechargeable energy device operably coupled to the controller means and a power interfacing means for charging the rechargeable energy device.

10. The tire pressure sensor module of claim 9, wherein the power interfacing means is for coupling with another tire pressure sensor module, the another tire pressure sensor module being configured to charge the rechargeable energy device through the power interfacing means.

11. A method of operating a tire pressure sensor module, comprising:
    determining information related to a pressure of a tire using a pressure sensor;
    selectively operating the tire pressure sensor module in an active state and in an inactive state using a controller, wherein an energy consumption of the tire pressure sensor module is lower in the inactive state than in the active state,
    supplying power to the tire pressure sensor module using an energy harvester; and controlling an output of the information related to the pressure of the tire in the active state using the controller, operating the tire pressure sensor module in the inactive state based on determining that information related to a velocity of the tire indicates a velocity above a threshold, wherein the information related to the velocity of the tire is received from the energy harvester.

12. The method of claim 11, wherein the tire pressure sensor module is configured for valve mounting or being comprised in a valve of the tire.

13. The method of claim 11, further comprises powering the controller using a battery.

14. The method of claim 11, further comprising:
providing a rechargeable energy device operably coupled to the controller and a power interface; and
charging the rechargeable energy device through the power interface.

15. The method of claim 14, wherein the power interface is configured to be coupled with another tire pressure sensor module, further comprising charging the rechargeable energy device through the power interface using the other tire pressure sensor module.

* * * * *